United States Patent [19]

Razzaghi

[11] Patent Number: 4,960,312

[45] Date of Patent: Oct. 2, 1990

[54] COMPACT HIGH RESOLUTION HIGH SPEED SYMMETRICAL SCANNING OPTICS USING MULTIPLE DEFLECTIONS

[76] Inventor: Mahmoud Razzaghi, 7469 Daytona St. #1, Lemon Grove, Calif. 92045

[21] Appl. No.: 419,252

[22] Filed: Oct. 10, 1989

[51] Int. Cl.$^5$ .................. G02B 26/08; G02B 26/10
[52] U.S. Cl. .................. 350/3.71; 350/6.5; 350/6.7; 350/6.8
[58] Field of Search .................. 350/6.7–6.9, 350/6.91, 96.1, 486, 481, 6.5–6.6, 3.71, 3.72; 250/334–336; 358/298, 486

[56] References Cited

U.S. PATENT DOCUMENTS 4,274,703  6/1981  Fisli .................. 350/6.8

Primary Examiner—Bruce Y. Arnold
Assistant Examiner—James Phan

[57] ABSTRACT

To remove the limitation imposed on the number of facets in rotating polygon scanners and to improve the scanning capabilities of vibrational rotating mirrors, a fixed mirror is positioned in front of a deflecting facet to implement successive deflections by the same deflecting facet. In the multiple deflection system thus formed, the deflecting facet width is used very efficiently by directing the input beam with tangential symmetry and oblique to the tangential plane, so that the said beam enters from one tangential side of the mirrors and emerges from the opposite side after a specific number of reflections and deflections between the two mirrors, irrespective of the angular position of the deflecting facet. There are also imaging optics to focus an essentially collimated input light beam to a tangential line image, direct the beam toward the multiple deflecting system, recollimate the output deflected beam and focus it to a circular spot on an image plane. By proper configuration of the beam, the major part of the sagittal scan spot displacement is eliminated in a self correcting mode during the multiple deflection process. The imaging optics, at the same time, corrects the remaining part of the displacement, so that relaxed tolerances on the deflecting facet errors are possible.

25 Claims, 7 Drawing Sheets

COMPACT HIGH RESOLUTION HIGH SPEED SYMMETRICAL SCANNING OPTICS USING MULTIPLE DEFLECTIONS

FIELD OF THE INVENTION

This invention relates to flying spot optical scanning devices which deflect a light beam through reflection by a rotating mirror and in particular, laser beam scanners having multifaceted rotating polygons or single faceted vibrating systems for recording, reading, and displaying information.

BACKGROUND OF THE INVENTION

In most optical scanners, generally, a rotating mirror is used to deflect an incident beam of light. The rotation may be continuous, as in multifaceted polygons, or vibrational, as in galvanometers and piezoelectric deflectors. The light beam rotates proportional to the rotation of the facet and is focused along its path, to a flying spot, which sweeps along a line on a surface. The resolution of the system is directly proportional to the width and angular rotation of the reflecting mirror. To obtain a higher resolution between two successive spots along the scan line, and to avoid vignetting of the reflected light beam during scanning, a wider facet with a larger angular rotation is required. On the other hand, to achieve a higher scanning speed in a more compact design, a smaller facet with smaller angular rotation must be used. These two opposing requirements, impose a rather tight limitation on the speed and resolution of the optical scanners. For example, in most practical underfilled polygon scanners used in laser printers, the number of facets is 8-14, the polygon diameter is 75-80 mm, the facet width is 18-25 mm, and the angle subtending each facet is 25-45 degrees. A natural way to increase the scanning speed is to increase the number of facets, but this will decrease the field angle and scan length proportionally and the resolution by a power of 2. Overfilled polygon scanners permit a smaller polygon with a larger number of facets, but due to the truncation of the reflected light, the spot is not circular, spot light intensity is variable, and most of the light energy is wasted (see U.S. Pat. No. 3,995,110). Facet tracking in overfilled systems reduces these difficulties, but it adds to the complexity and price of the device (see U.S. Pat. No. 4,205,348). Also, there is the drawback of smaller scan field angle and larger focal length. Presently, in the state of the art high speed and ultra high speed scanners and printers, and general trend is to use high speed polygons. For example, in Hitachi printer, model DIPS-6000, the polygon rotates at 42000 rpm. However, high speed rotation introduces many problems such as critical manufacturing specifications, polygon dynamic instability, excessive distortion of the facets, siren noise, excessive wear, and higher stress.

Therefore, it is desirable to have a system that satisfies all requirements, while working at a lower rotational speed.

OBJECTS

In accordance with the above description of the prior art and the existing systems of flying spot scanners, the objects of this invention include:

1. Removing the limitation imposed by resolution and scan angle requirements on multifaceted polygon scanners to such an extent that they can satisfy the demanding high speed scanning requirements in present and future scanning systems at reasonable rotational speeds.

2. Achieving object 1 by increasing the allowable number of facets in polygon scanners by a multiple of times while maintaining other requirements such as scanning speed, resolution and scan angle, and keeping polygon size and duty cycle within acceptable limits, thus decreasing the required rotational speed for a specific scanning requirement.

3. Increasing the scan angle and resolution of vibrational scanners, such as galvanometers and piezoelectric deflectors, to improve their scanning capabilities for more demanding applications.

4. Achieving the above objects by increasing the field angle and resolution of all types of mirror deflectors, in general, by a multiple of times, without increasing the size and the angular rotation of the mirror, through a more efficient use of the mirror at all instants during scanning.

5. Achieving object 4 by using a simple, practical and economical system, which at the same time, allows a relaxed tolerance for the facet to rotational axis parallelism.

6. Achieving objects 4 and 5 by folding the deflected beam of light back onto the scanning mirror for a multiple of times by a flat mirror fixed in front of the scanning mirror at an appropriate distance, and therefore, increasing the scan angle and resolution upon each extra deflection by an amount equal to that for a single deflection.

7. Directing the input beam toward the deflector, in a direction oblique to the tangential plane, to enter symmetrically from one tangential side of the said mirrors and emerge from the opposite side after a number of reflections and deflections between the two mirrors.

8. Using a cylindrical or toroidal lens or mirror for passive elimination of the scan spot displacement in the direction perpendicular to the scan line due to nonparallelism of the mirror to its rotational axis.

9. Using the improved scanning systems as described above in different applications including electronic reading, recording, and display devices.

SUMMARY OF THE INVENTION

The invention provides devices to implement the above and other objects. A flat mirror is fixed in front of a scanning mirror such as a multifaceted rotating polygon or a galvanometric or piezoelectric vibrational deflector to make a multiple deflection system. A first cylindrical optical element focuses a beam of light to a tangential line perpendicular to the rotational axis of the mirror. The beam being essentially collimated in the tangential plane, is directed toward either of the said mirrors entering symmetrically in a direction oblique to the tangential plane, from one tangential side of the mirrors and emerging from the opposite side. The scanning mirror deflects the input beam successively for a multiple of times with the help of the fixed mirror, which folds the deflected beam back to the scanning mirror each time. A second cylindrical or toroidal optical element, used as a passive correcting means, brings the output beam to an essentially collimated beam to eliminate the sagittal displacement of the scan line, and directs the beam toward a focusing system. The said focusing system focuses the rotating beam to a circular spot sweeping along a line on the image plane. During each scan cycle, the light beam remains completely seated on the scanning mirror and the fixed mirror to prevent vignetting of the light beam.

In another embodiment of the invention, the same system as described above is employed, with the exception that the two cylindrical optical elements are omitted. An essentially collimated beam of light is used as the input beam and the output deflected beam, which is still in collimated shape, is focused directly by the focausing system. Sagittal displacement of the scan spot is corrected by deflecting the input beam sagittally proportional to the amount of displacement, by one of the active correction methods known in the art.

Different preferred embodiments will be discussed in detail in conjunction with the accompanying drawings.

DESCRIPTION OF THE DRAWINGS AND TABLES

Table 1 shows some examples of the invention as applied to laser printers.

DETAILED DESCRIPTION OF THE INVENTION AND PREFERRED EMBODIMENTS

Figure 1:
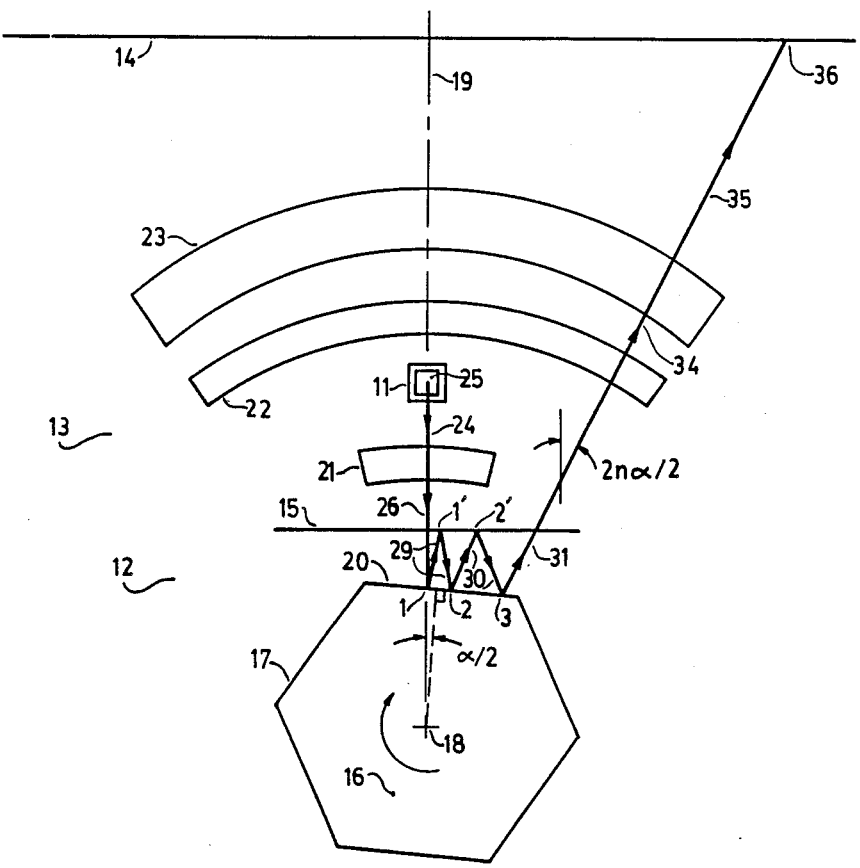
FIG. 1 is a tangential view of the first, second and third preferred embodiments of the invention.
Figure 2:
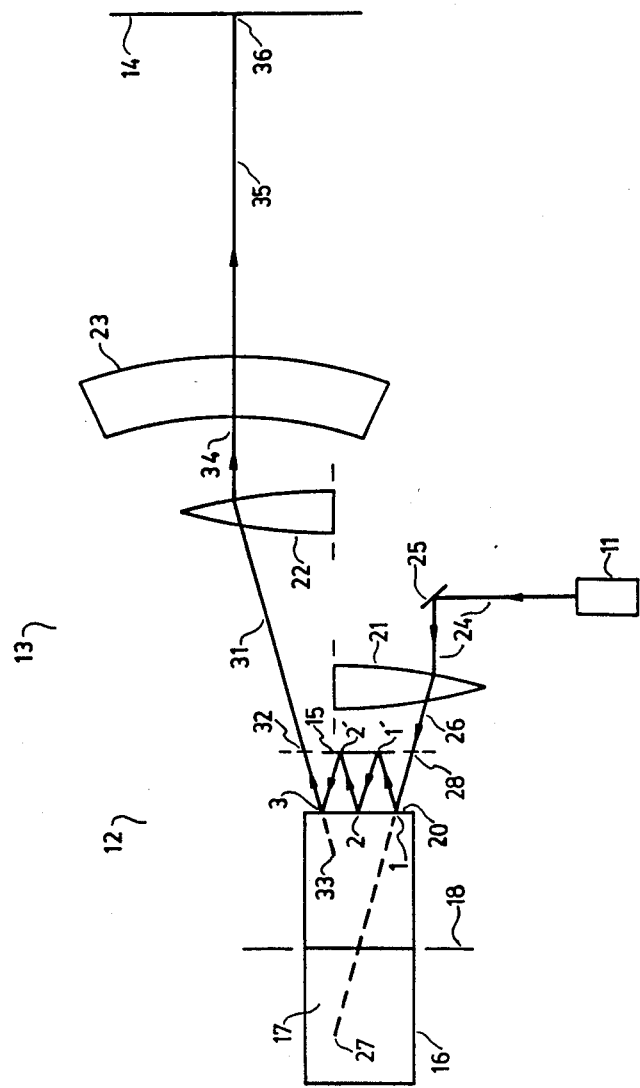
FIG. 2 is a sagittal view of the first preferred embodiment of the invention.
Figure 3:
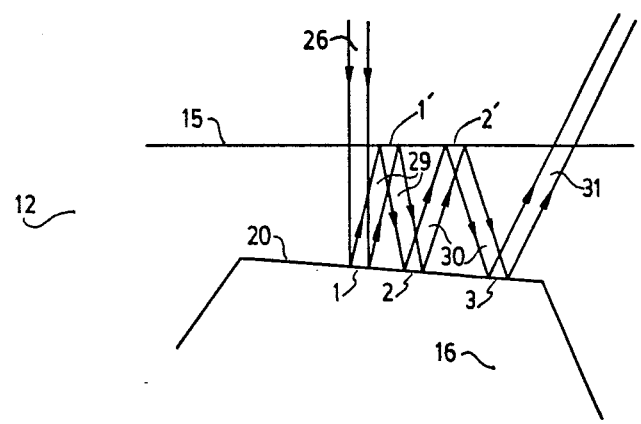
FIG. 3 is a detailed tangential view of the multiple deflection system 12 shown in FIG. 1.
Figure 4:
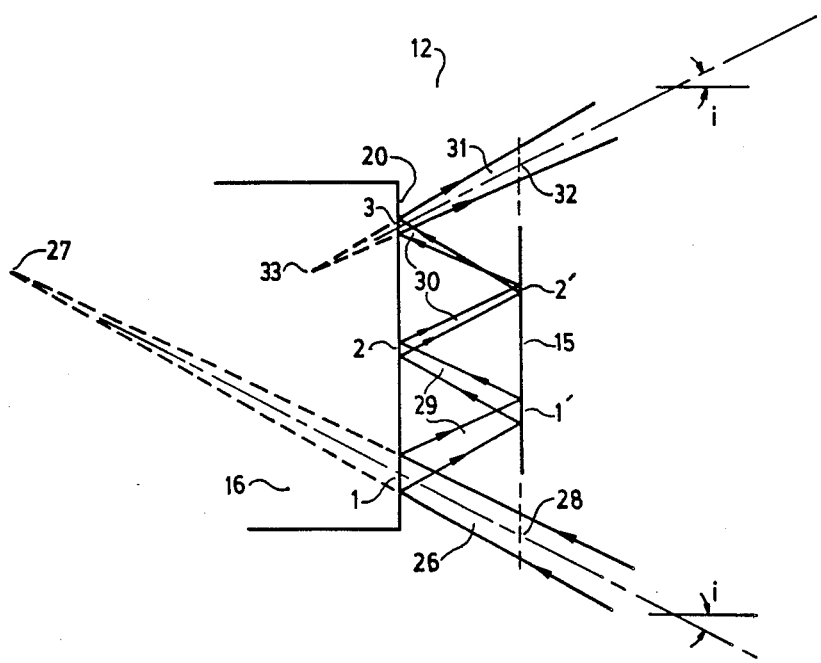
FIG. 4 is a detailed sagittal view of the multiple deflection system 12 shown in FIGS. 2, 5 and 6.

In the first preferred embodiment of the invention according to FIGS. 1 and 2 and detailed drawings of FIGS. 3 and 4, there is a flying spot optical scanning system comprising of a light source 11 to provide a collimated beam of light, a multiple deflection system 12 to deflect the beam of light a multiple of times, imaging optics 13 to focus and direct the beam of light toward the deflecting system 12, recollimate the reflected and deflected beam and focus it to a circular spot on an image plane 14.

The most important feature of the invention is the multiple deflection system 12, which comprises of a fixed mirror 15 positioned in front of a rotating mirror such as a multifaceted polygon 16. The fixed mirror 15 is an inseparable and essential feature of the invention. Polygon 16 is a regular prismatic polygon having a plurality of essentially planar reflecting facets 17 around its rotational axis 18, and rotating at an essentially constant speed.

The fixed mirror 15 is positioned parallel to the rotational axis 18. As polygon 16 rotates, its facets 17 sequentially face the fixed mirror 15. The facet 20 facing the fixed mirror 15 at any time is used as the deflecting facet and is called by the same name. As the deflecting facet 20 rotates tangentially in front of the fixed mirror 15, at some instant the two said mirrors become parallel. This position is called the reference position. The scanning system is preferably symmetric relative to the reference position. The distance between the deflecting facet 20 and the fixed mirror 15 at the reference position is $h_0$.

Throughout the description of the invention, references are made to some planes and directions, which are defined here for clarity. Tangential plane is a plane perpendicular to the rotational axis 18 of polygon 16. Sagittal plane is a plane perpendicular to the tangential plane. Tangential direction is a direction on the tangential plane, perpendicular to a radial line. Sagittal direction is the direction perpendicular to the tangential plane. Optical axis 19 is a radial line perpendicular to the fixed mirror 15.

In all preferred embodiments described here, each scanning system is preferably symmetric tangentially relative to the sagittal plane which includes the optical axis, and so is each separate component of the scanning system. However, nonsymmetric embodiments are also possible.

The imaging optics 13, comprises of a cylindrical lens 21 located between the light source 11 and the deflecting system 12, with its plane of negligible power being parallel to the tangential plane, a cylindrical lens 22 substantially identical to the cylindrical lens 21, positioned in optical symmetry with the said lens 21 between the deflecting system 12 and image plane 14, and a focusing system 23 located between cylindrical lens 22 and image plane 14, with its axis parallel to the tangential plane. Cylindrical lenses 21 and 22 have preferably a curvature in the tangential plane so that the sagittal plane of the light beam is perpendicular to the said lenses at all times during a complete scan cycle. Focusing system 23 is preferably comprised of two or more elements located along its optical axis. To provide an essentially linear scan, the focusing system 23 has a symmetrical negative distortion so that at any instant the distance between the focused spot and the center of the scan line is proportional to the scan half field angle.

Image plane 14 can be a photosensitive surface, a display screen, or a memory device for reading or recording.

Light source 11, such as a laser, provides a substantially collimated beam of light 24 with appropriate diameter and modulation. Beam 24 is reflected by mirror 25 and is applied to the cylindrical lens 21 with tangential symmetry in a direction parallel to its plane of negligible power (or tangential plane). Cylindrical lens 21 converts beam 24 into beam 26, which is convergent in the sagittal plane and still collimated in the tangential plane, to focus to a tangential line 27 at its focal line. Beam 26 emerges from cylindrical lens 21 and enters the deflecting system 12 with tangential symmetry in a direction oblique to the tangential plane with an angle i, from one tangential side 28 of the fixed mirror 15 and preferably before making a real image, impinges on the deflecting facet 20 at 1. Upon rotation, the deflecting facet 20 deflects beam 26 to beam 29. Beam 29 impinges on the fixed mirror 15 at 1' and is reflected or folded back to the deflecting facet 20, where it sits at 2. Once again, the deflecting facet 20 deflects the reflected beam 29 to beam 30, which impinges on the fixed mirror at 2' and is reflected or folded back to the deflecting facet 20 where it sits at 3. For the third time, beam 30, reflected from the fixed mirror 15, is deflected by the deflecting facet 20 to beam 31, which leaves the deflecting system 12 from the other tangential side 32 of the fixed mirror 15 in a plane oblique to the tangential plane with the same angle i, irrespective of the amount of rotation of the deflecting facet. During the deflection of the light beam 26 by the deflecting system 12, the beam is completely seated on the respective mirror upon which it impinges.

Upon each extra deflection by the deflecting facet 20, the scan field angle or the angle between the two extremities of the deflected beam increases by the same amount as that for a single deflection. By the same token, resolution increases proportionally. It is understood that the number of deflections in the first and other preferred embodiments described here is chosen to be 3 merely as a general example, and other values can be used as well. Thus, If the number of deflections is n and the deflecting facet 20 rotates by an angle $\alpha$, then the total deflection of the output light beam 31 is $$\psi = 2n\alpha$$

Therefore, the total deflection is n times that for a single deflection, and the invention can be applied in great advantage to make scanners with larger field angle, smaller facet, smaller rotation, or a combination of them while satisfying other scanning requirements.

The tangential dimension (width) of the deflecting facet 20 is used very efficiently due to the combined effect of two properties of the deflecting system 12. First, as the deflecting facet 20 rotates, at larger deflections, the first incidence 1 of the light beam 26 is closer to one end of the said facet and a wider portion of its width is available to accommodate the farther-going beams 29 and 30 reflected form the fixed mirror 15. Second, as the deflecting facet 20 rotates in one direction, the beams 29 and 30 reflected from the fixed mirror 15 follow or track the deflecting facet in the same direction. In fact, by selecting a small value for $^h0$, a deflecting facet with a specific width and duty cycle in single deflection mode can accommodate a relatively large number of extra deflections, and maintain the same duty cycle (see table 1).

The cylindrical lens 21 is positioned relative to the deflecting system 12 such that the output deflected beam 31 is preferably divergent in the sagittal plane, making an imaginary object 33 for the cylindrical lens 22. The imaginary object 33 is a tangential line similar to 27 and is located at the focal line of the cylindrical lens 22, which consequently configures beam 31 into an essentially collimated beam 34. Since cylindrical lenses 21 and 22 are identical and positioned in optical symmetry relative to each other, any distortion or abberation introduced by cylindrical lens 21 is eliminated by cylindrical lens 22 and the deflected beam 34 is essentially identical to the input beam 24.

Beam 34 enters the focusing system 23 where it is converted into converging beam 35, which focuses to a scanning circular light spot 36 on the image plane 14.

The light spot 36 is the image of the focal line 33. Since the beam is collimated in the tangential plane the position of the scan spot along the scan line is not affected by runout of the said focal line. The sagittal displacement of the scan spot is directly proportional to the sagittal displacement or runout of the focal line 33, which is corrected by the cylindrical lens 22. It can be shown that the amount of correction is $f_{23}/f_{22}$ where $f_{22}$ is the focal length of the cylindrical lens 22 and $f_{23}$ is the focal length of the focusing system 23. Magnifications down to 1/10 are possible with relaxed lenses for relatively small focal lengths.

The sagittal displacement of the scan spot comes from three sources. First is the rotation of the deflecting facet 20. As the deflecting facet 20 rotates, the optical path length of the beam segments between the said deflecting facet and the fixed mirror 15 changes, which results in a change in the position of the focused line 33. Second is inaccuracies in the radial position of the deflecting facet 20, with a subsequent change in $^h0$, resulting in the same effect of change in optical path length. However, in this case, the translation of the output beam 31 and the change in optical path length work in opposite directions, resulting in a reduced runout which is zero at the reference or central position and increases with the rotation of the facet. Third is facet wobble or inaccuracies in the parallelism of the deflecting facet 20 with its rotational axis, which has essentially negligible effect on the said optical path length, but causes runout by sagittally deflecting the beam segments between the deflecting facet 20 and the fixed mirror 15, resulting in combined translation and rotation of the output deflected beam 31. Compared to a single deflection system, runout due to the first source is additional and runout due to the second and third sources increase by the extra number of deflections. Therefore, runout would be much higher than the correcting limit of the optical system 13. As a very important feature of the invention, the runout of the line image 33 due to facet wobble is automatically reduced to a great extent by positioning the cylindrical lens 21 relative to the deflecting system 12 such that the output deflected beam 31 is divergent in the sagittal plane and the line image 33 is imaginary. In this way, any sagittal translation of the line image 33 is reduced by its accompanying opposite rotation. By choosing an appropriate length le for the imaginary length of beam 31 between the image line 33 and the deflecting facet 20 at the reference or central position, the total runout of the line image 33 can be minimized. In this way, the same accuracies as in single deflection systems, are easily obtained (see table 1).

The runout of the line image 33 also depends directly on the distance $^h0$ and the angle of incidence i. Therefore it is desirable to minimize both of them. First, the maximum value of $^h0$ is determined so that the deflecting facet 20 can accommodate the required number of deflections. Then, i and $^h0$ are optimized together for a combination of their minimum possible values while considering physical limitations such as the sagittal dimension and edge effect of the fixed mirror 15.

After specifying $^h0$ and i, le is optimized for minimum sagittal runout of the line image 33 due to a prescribed facet wobble $\phi$. Finally, the maximum allowable amount of tolerance $\delta^h0$ for the radial position of the deflecting facet is found for a specified total runout due to all three said sources of runout.

With the above considerations, the runout of the line image 33 along the optical axis 19 would be generally smaller than that for a single deflection system and the focused spot 36 would be quite well within the depth of field of the focusing system 23 at all scan angles.

The locus of the line image 33 is a symmetric curve with its concave side toward the focusing system which helps flatten its curvature of field.

By tracing the axis of the light beam during deflection between the deflecting facet 20 and the fixed mirror 15, the position and total runout of the focal line image 33 in different directions are found at different angular positions $\alpha/2$ of the said facet relative to the optical axis. A wobble of $\phi$ and a radial tolerance of $\delta h_0$ for the deflecting facet are included in the formulation. The position of the line image at $\alpha/2=0$, $\phi=0$, and $\delta h_0=0$ is used as its reference position $P_0$. In sagittal direction, the position of $P_0$ is measured relative to point 28 which is the intersection between the axis of the input beam 26 and the plane of the fixed mirror 15. The subtending angle $\theta$ of the deflecting facet in degrees is $$\theta = \frac{360}{N}$$

where N is the number of facets of the polygon. The facet width can be found as $$W = 2R\sin\frac{\theta}{2}$$

where R is the circumscribing radius of the polygon. The duty cycle U is $$U = (W-d)/W$$

where d is the beam diameter. Polygon (facet) lift at the first incidence of the light beam on the deflecting facet $p_1$ is $$p_1 = R\cos\frac{\theta}{2}\left(\frac{1}{\cos\frac{\alpha}{2}} - 1\right)$$

where $\alpha/2$ is the rotation of the polygon or deflecting facet relative to the optical axis. The tangential position of the first incidence of the light beam on the deflecting facet relative to the center of the facet is found as $$e_1 = R\cos\frac{\theta}{2}\tan\frac{\alpha}{2}$$

The initial optical path length of the beam between the deflecting facet and the fixed mirror up to the last incidence on the deflecting facet $L_0$ is $$L_0 = (2n - 1)\frac{h_0}{\cos i}$$

where $h_0$ is the distance between the deflecting facet and the fixed mirror at reference position ($\alpha/2=0$), n is the total number of deflections, and i is the sagittal angle of incidence of the input beam to the deflecting system 12. The sagittal component of the initial total optical path length between the deflecting facet and the fixed mirror is $$L_{0s} = (2n-1)h_0\tan i$$

The length of the kth beam segment between the deflecting facet and the fixed mirror $l_k$ (starting from the input beam 26) and its tangential and sagittal components $l_{kt}$ and $l_{ks}$ and the tangential position of the kth incidence of the light beam on the deflecting facet relative to the first incidence $w_k$ can be found successively for different values of k as follows:

$$l_{1t} = (h_0 + \delta h_0) - p_1$$

where $\delta h_0$ is the tolerance in $h_0$ or radial position of the deflecting facet.

$$l_{1s} = l_{1t}\tan i$$

$$l_{2t} = \frac{l_{1t}}{\cos\frac{2\alpha}{2}}$$

$$l_{2s} = l_{1t}\tan(i + 2\phi)$$

$$l_{3t} = l_{2t}\frac{\cos\frac{\alpha}{2}}{\cos\frac{3\alpha}{2}}$$

$$w_2 = l_{2t}\cos\frac{\alpha}{2}\left(\tan\frac{\alpha}{2} + \tan\frac{3\alpha}{2}\right)$$

$$l_{3s} = \left(l_{1t} + w_2\sin\frac{\alpha}{2}\right)\tan(i + 2\phi)$$

$$l_{4t} = l_{3t}\frac{\cos\frac{2\alpha}{2}}{\cos\frac{4\alpha}{2}}$$

$$l_{4s} = \left(l_{1t} + w_2\sin\frac{\alpha}{2}\right)\tan(i + 4\phi)$$

At this point two deflections are completed.

$$l_{5t} = l_{4t}\frac{\cos\frac{3\alpha}{2}}{\cos\frac{5\alpha}{2}}$$

$$w_3 = w_2 + l_{4t}\cos\frac{3\alpha}{2}\left(\tan\frac{3\alpha}{2} + \tan\frac{5\alpha}{2}\right)$$

$$l_{5s} = \left(l_{1t} + w_3\sin\frac{\alpha}{2}\right)\tan(i + 4\phi)$$

$$l_{6t} = l_{5t}\frac{\cos\frac{4\alpha}{2}}{\cos\frac{6\alpha}{2}}$$

$$l_{6s} = \left(l_{1t} + w_3\sin\frac{\alpha}{2}\right)\tan(i + 6\phi)$$

At this point three reflections are completed. Similar procedure may be followed for higher numbers of deflection n. Then, $$l_k = \sqrt{(l_{ks})^2 + (l_{kt})^2} \text{ for } k = 1, 2, \ldots, 2n$$

The total change of the optical path length between the deflecting facet and the fixed mirror $\Delta L$ is $$\Delta L = \sum_{k=1}^{2n-1} l_k - L_0$$

where $\Delta L > 0$ means an increase and $\Delta L < 0$ means a decrease in the optical path length. It can be shown that the total runout of the image line 33 in the sagittal direction $\delta_s$ is $$\delta_s = \sum_{k=1}^{2n-1} l_{ks} - (\Delta L + l_e) \frac{l_{(2n)s}}{l_{(2n)}} - (L_{0s} - l_e \sin i)$$

where $l_e$ is the length of the output deflected beam between the image line and the deflecting mirror. As a sign convention $l_e > 0$ when the line image 33 is imaginary and $l_e < 0$ when the line image is real. $\Delta L$ is also used with its algebraic sign. With this sign convention, $\delta_s > 0$ means the runout is toward the output side of the deflecting system and $\delta_s < 0$ means it is toward the input side. Also, the total runout of the image line 33 along the optical axis $\delta_a$ is $$\delta_a = -(\Delta L + l_e) \frac{l_{(2n)t}}{l_{(2n)}} \cos \frac{2n\alpha}{2} + R \cos \frac{\theta}{2} \left( \frac{1}{\cos \frac{\alpha}{2}} - 1 \right) -$$

$$w_n \sin \frac{\alpha}{2} + l_e \cos i$$

With the sign convention used, $\delta_a > 0$ means the runout is toward the image plane and $\delta_a < 0$ means it is away from the image plane. For the third preferred embodiment of the invention, the runout must be found relative to the optical axis of the cylindrical lens 22 which has an angle i with the tangential plane. Thus, $$(\delta_s)_i = \delta_s \cos i - \delta_a \sin i$$

$$(\delta_a)_i = \delta_a \cos i + \delta_s \sin i$$

The tangential position of kth incidence of the light beam on the deflecting facet relative to the center of the facet $e_k$ is $$e_k = w_k - e_l$$

where $e_k > 0$ means the first and last incidence are on two sides of the center of the facet and $e_k < 0$ means they are on one side. $e_n$ can be used to make sure that the last incidence is completely seated on the deflecting facet where $$e_n = w_n - e_1$$

For a single rotating or vibrating mirror, the same formulation as derived for the rotating polygon can be used with the conditions $$R = 0$$

$$\delta h_0 = 0$$

Figure 5:
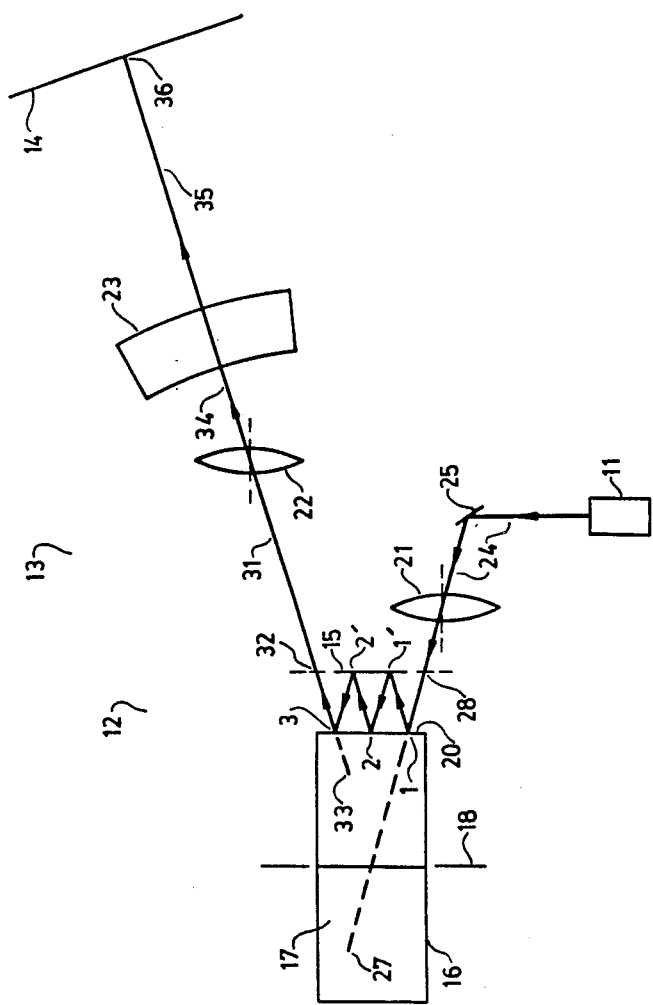
FIG. 5 is a sagittal view of the second preferred embodiment of the invention.
Figure 6:
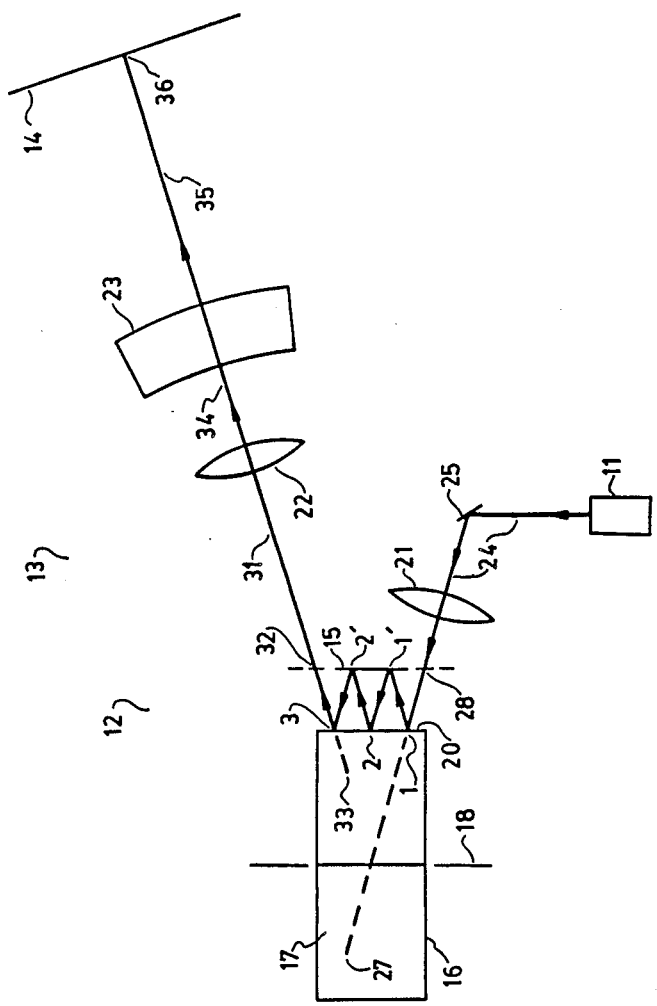
FIG. 6 is a sagittal view of the third preferred embodiment of the invention.

FIGS. 5 and 6 show respectively the sagittal views of the second and third preferred embodiments of the invention. They are principally similar to the first embodiment with some changes in relative orientation of the optical elements 21, 22, and 23 and the direction of the beam 24 applied to cylindrical lens 21, and have the same schematic tangential view as FIG. 1.

In the second preferred embodiment of the invention, the same configuration as the first embodiment is employed with the following changes:

The essentially collimated beam 24 from the light source is applied to the center of the cylindrical lens 21, preferably with tangential symmetry, oblique to the tangential plane with an angle i. Cylindrical lens 21 converts beam 24 into beam 26 which is convergent in the sagittal plane and still collimated in the tangential plane, to focus to a tangential line 27 at its focal plane. Beam 26, having the same axis and direction as beam 24, enters the deflecting system 12 and leaves it as beam 31 in the same way as described in the first preferred embodiment. Cylindrical lens 22, being in optical symmetry with cylindrical lens 21 has the imaginary line image 33 at its focal plane such that the deflected beam 31 enters the cylindrical lens 22 at its tangential center line and emerges as beam 34 in essentially collimated shape, having the same axis and direction as beam 31. The axis of the focusing system 23 is oblique to the tangential plane with angle i to lie in the plane scanned by the deflected beam 34. Collimated beam 34 enters the focusing system 23 and leaves it as the convergent beam 35 to focus to the scanning light spot 36 on the image plane 14. The image plane is also oblique to the tangential plane with the same angle i to stay parallel with the focusing system 23.

In the third preferred embodiment of the invention, the same configuration as the first embodiment is employed with the following changes:

The planes of negligible power of cylindrical lenses 21 and 22 and the axis of the focusing system are oblique to the tangential plane with angle i. The essentially collimated beam 24 from the light source is applied to the center of the cylindrical lens 21, preferably with tangential symmetry, oblique to the tangential plane with the same angle i, and therefore, perpendicular to the plane of power of the said cylindrical lens. Cylindrical lens 21 converts beam 24 into beam 26 which is convergent in the sagittal plane and still collimated in the tangential plane, to focus to a tangential line 27 at its focal plane. Beam 26, having the same axis and direction as beam 24, enters the deflecting system 12 and leaves it as beam 31 in the same way as described in the first preferred embodiment. Cylindrical lens 22, being in optical symmetry with the cylindrical lens 21 has the imaginary line image 33 at its focal line such that the deflected beam 31 enters the cylindrical lens 22 at its tangential center line and emerges as beam 34 in essentially collimated shape, having the same axis and direction as beam 31. The axis of the focusing system 23 is oblique to the tangential plane with angle i to lie in the plane scanned by the deflected beam 34. Collimated beam 34 enters the focusing system 23 and leaves it as the convergent beam 35 to focus to the scanning light spot 36 on the image plane 14. The image plane is also oblique to the tangential plane with the same angle i to stay perpendicular to the scan plane.

Figure 7:
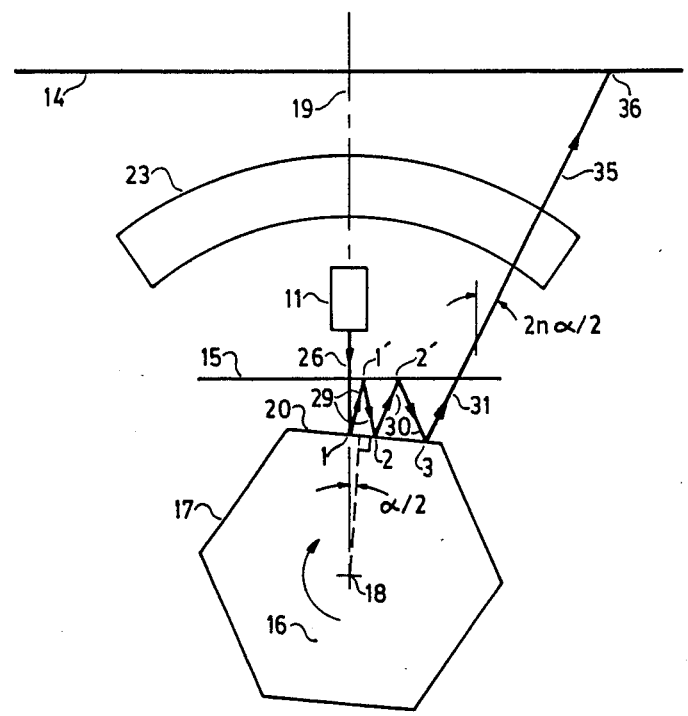
FIG. 7 is a tangential view of the fourth preferred embodiment of the invention.
Figure 8:
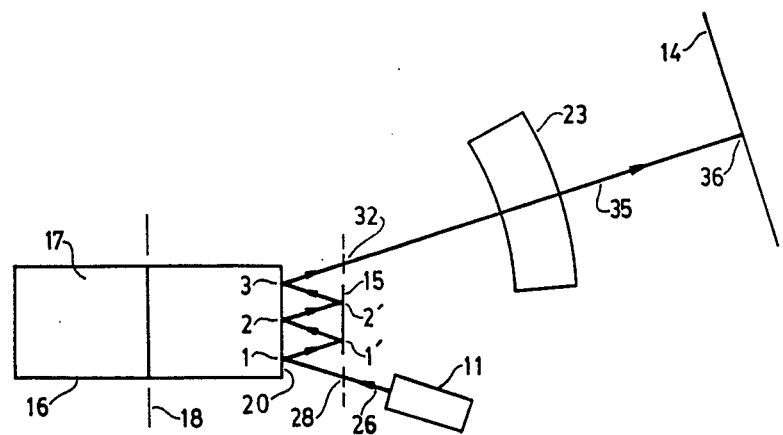
FIG. 8 is a sagittal view of the fourth preferred embodiment of the invention.

FIGS. 7 and 8 show the forth preferred embodiment of the invention which has a similar configuration as the first embodiment with the following changes:

Cylindrical lenses 21 and 22 are omitted and the essentially collimated beam 26 from the light source is applied directly to the deflecting system 12 with tangential symmetry and in a direction oblique to the tangential plane with an angle i. Beam 26 enters the deflecting system 12 from one tangential side 28 of the fixed mirror and impinges on the deflecting facet 20 at 1. Upon rotation, the deflecting facet 20 deflects beam 26 to beam 29. Beam 29 impinges on the fixed mirror 15 at 1' and is reflected or folded back to the deflecting facet 20, where it sits at 2. once again, the deflecting facet 20 deflects the reflected beam 29 to beam 30, which impinges on the fixed mirror at 2' and is reflected or folded back to the deflecting mirror 20 where it sits at 3. For the third time, beam 30, reflected from the fixed mirror 15, is deflected by the deflecting facet 20 to beam 31, which leaves the deflecting system 12 from the other tangential side 32 of the fixed mirror 15 in a plane oblique to the tangential plane with the same angle i, irrespective of the amount of rotation of the deflecting facet. During the deflection of the light beam 26 by the deflecting system 12, the beam is completely seated on the respective mirror upon which it impinges. The output deflected beam 31, which is still collimated in both sagittal and tangential planes, enters the focusing system 23 and leaves it as convergent beam 35 to focus to a scanning light spot 36 on the image plane 14. The axis of the focusing system 23 is oblique to the tangential plane with angle i to lie in the plane scanned by the deflected beam 31. The image plane is also oblique to the tangential plane with the same angle i to stay perpendicular to the scan plane. Since the beam is essentially collimated during deflection, its translation is not critical and there is more flexibility in the values of $h_0$ and i. The only source of displacement of the scan spot is facet wobble or nonparallelism of the deflecting facet with its rotational axis, which deflects the output beam 31 in the sagittal plane. The sagittal displacement of the scan spot is corrected by deflecting the input beam 26 proportional to the amount of displacement using one of the active correcting methods known in the art (not shown).

Figure 9:
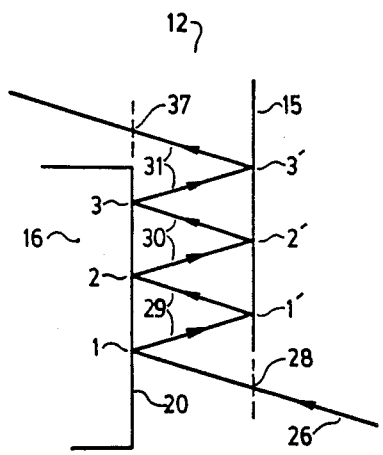
FIG. 9 is a sagittal view of a different possible way for the entrance and emergence of the beam applied to the multiple deflection system.
Figure 10:
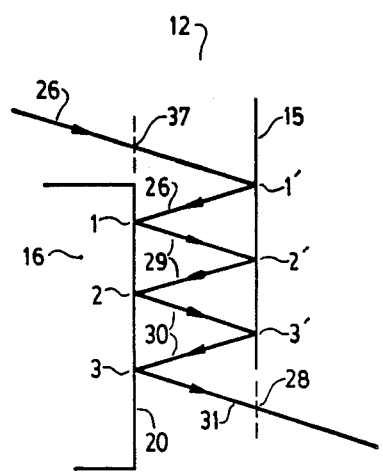
FIG. 10 is a sagittal view of another possible way for the entrance and emergence of the beam applied to the multiple deflection system.

FIGS. 9 and 10 show two other possible ways for applying beam 26 to the deflecting system 12 for all preferred embodiments of the invention.

In FIG. 9, beam 26 enters from one tangential side 28 of the fixed mirror 15, first impinges on the deflecting facet 20 at 1 and follows the path 1-1'-2-2'-3-3' and then leaves from the opposite tangential side 37 as beam 31 with its last incidence on the fixed mirror 15 at 3'.

In FIG. 10, beam 26 enters from one tangential side 37 of the deflecting facet 20, first impinges on the fixed mirror 15 at 1' and follows the path 1'-1-2'-2-3'-3 and then leaves from the opposite tangential side as beam 31 with its last incidence on the deflecting facet at 3.

With the configurations of FIGS. 9 and 10 described above there is no need to compute the limiting maximum sagittal dimension of the fixed mirror 15 to allow the entrance and emergence of the light beam applied to the deflecting system 12. In fact one side of each mirror 15 and 20 is a "free end" and only the relative positioning of the two mirrors should be considered to allow the entrance and emergence of the light beam.

As an application, the invention can be used advantageously in laser printing systems. Table 1 shows some examples covering a whole range from low speed desktop to ultra high speed printers. As seen from the table, great advantages such as large number of facets, low polygon rotational speeds, and small focal lengths are achieved all together with high efficiencies, practical polygon sizes, relaxed polygon tolerances and relaxed optical elements.

TABLE 1

| EXAMPLES FOR LASER PRINTERS | | | | | | | | | |
|---|---|---|---|---|---|---|---|---|---|
| number of deflections, n | | 4 | | | 3 | | | 2 | |
| number of facets, N | 72 | 60 | 48 | 60 | 48 | 36 | 36 | 30 | 24 |
| polygon speed, 1000 rpm | 8 | 9 | 9 | | 6 | | 4 | 3.6 | 3.3 |
| scanning speed, 1000 scans/sec | 9.6 | 9 | 7.2 | 6 | 4.8 | 3.6 | 2.4 | 1.8 | 1.3 |
| resolution | | | | | 11.8 dots,mm | | | | |
| printing speed, pages/min | 240 | 225 | 180 | 150 | 120 | 90 | 60 | 45 | 24 |
| scan field andgle, deg. | 28 | 33 | 45 | 25 | 34 | 45 | 30 | 36 | 44 |
| focal length, f cm | 61 | 50 | 37 | 69 | 50 | 37 | 57 | 47 | 32 |
| duty cycle, U % | 70 | 70 | 75 | 70 | 75 | 75 | | 75 | |
| polygon diameter, D mm | 195 | 163 | 153 | 163 | 153 | 115 | 115 | 96 | 77 |
| facet subtending angle, $\theta$ deg. | 5 | 6 | 7.5 | 6 | 7.5 | 10 | 10 | 12 | 15 |
| useful rot. of facet, $\alpha$ deg. | 3.5 | 4.2 | 5.6 | 4.2 | 5.6 | 7.5 | 7.5 | 9 | 11 |
| facet width, W mm | 8.5 | 8.5 | 10 | 8.5 | 10 | 10 | | 10 | |
| beam diameter, d mm | | | | | 2.5 | | | | |
| displacement of scan spot, mm | | | | | .01 | | | | |
| facet wobble, $\phi$ arc min. | 6 | 5 | 3 | 8 | 6 | 4 | 18 | 15 | 10 |
| facet radial tolerance, $\delta h_0$ mm | | | | | .05 | | | | |
| sag. displ. of line image, $\delta_s$ mm | .07 | .06 | .05 | .07 | .06 | .05 | .07 | .06 | .04 |
| magnification of line image | 1/7 | 1/6 | 1/5 | 1/7 | 1/6 | 1/5 | 1/7 | 1/6 | 1/4 |
| axial displ. of line image, $\delta_a$ mm | .5 | .5 | .5 | .5 | .5 | .4 | | .5 | |
| sag. angle of incidence, i deg. | | | | | 15 | | | | |
| mirror to facet dist., $h_0$ mm | | 4 | | | 4 | | | 5 | |
| $l_e$ mm | | 8 | | | 4 | | | 2.5 | |
| sag. dim. of the fixed mirror, mm | | 6 | | | 4 | | | 3 | |

I claim:

1. A flying spot optical scanning system, employing efficient successive deflections to enhance scanning capabilities, said system comprising of:
light source for supplying a light beam;
surface to be scanned by the light beam;
rotating mirror for deflecting the light beam;
fixed mirror positioned face to face in front of the rotating mirror, the combination of the fixed mirror and the rotating mirror making a multiple deflection system, implementing successive deflections of the input light beam applied thereto, the input beam enters the multiple deflection system from one tangential side of the mirrors, the fixed mirror folds the deflected light beam from the rotating mirror back to the rotating mirror successively, until the final deflected output beam emerges from the multiple deflection system, from the other tangential side of the mirrors, after a predetermined number of deflections, irrespective of the angular position of the rotating mirror, the light beam remaining fully seated on the rotating mirror and the fixed mirror during each complete scan cycle;

first optical means positioned optically between the light source and the multiple deflection system to configure and direct the light beam from the light source toward the multiple deflection system; and second optical means positioned optically between the multiple deflection system and the scanned surface to configure and focus the deflected output beam emerging from the multiple deflection system to a scanning circular light spot on the scanned surface;

whereby, a larger scan angle and a higher resolution are obtained with high efficiency, through a smaller rotation of the rotating mirror as compared to a conventional single deflection system.

2. The flying spot optical scanning system of claim 1 wherein the first and second optical means are essentially symmetrical relative to a sagittal plane of symmetry including the rotational axis of the rotating mirror and perpendicular to the plane of the fixed mirror, the light beam from the first optical element is applied with tangential symmetry to the multiple deflection system, the axis of the beam lying in the plane of symmetry.

3. The flying spot optical scanning system of claim 2 wherein the planes of the rotating mirror and the fixed mirror are essentially parallel to the rotational axis of the rotating mirror.

4. The flying spot optical scanning system of claim 3 wherein the distance between the rotating mirror and the fixed mirror, and the sagittal angle of incidence of the light beam (the angle between the axis of the light beam and the tangential plane) applied to the multiple deflection system are optimized together for their minimum possible values, while considering the minimum possible size and relative positioning of all the relevant scanning system elements, to both allow the specified number of deflections for a given tangential dimension of the rotating mirror, and when applicable, minimize the sagittal displacement of the scan spot caused by inaccuracies in parallelism of the rotating mirror to its rotational axis and radial position of the rotating mirror relative to its rotational axis.

5. The flying spot optical scanning system of claim 4 wherein:

the light beam from the light source is essentially collimated;

the first optical means includes:

first optical element having major and minor axes of different focal length to sagittally converge and focus the light beam from the light source to a tangential line perpendicular to the rotational axis of the rotating mirror, and direct the light beam toward the multiple deflection system, the light beam remaining essentially collimated in the the tangential plane; and the second optical means includes:

second optical element having major and minor axes of different focal length, the second optical element being essentially identical to the first optical element, positioned in optical symmetry relative to the first optical element to bring the deflected output beam emerging from the multiple deflection system to a substantially collimated beam, where at the same time, any distortion or abberation introduced by the first optical element is essentially offset by the second optical element due to optical symmetry; and focusing system for focusing the collimated light beam emerging from the second optical element to a scanning circular light spot on the scanned surface, the axis of the collimated light beam lying in a plane including the optical axis of the focusing system;

whereby the displacement of the scanning light spot in the sagittal direction perpendicular to the scan line is reduced to essentially negligible values, thus allowing a relaxed tolerance for parallelism and radial position of the rotating mirror relative to its rotational axis.

6. The flying spot optical scanning system of claim 5 wherein the deflected output beam emerging from the multiple deflection system is divergent in the sagittal plane, making an imaginary object for the second optical element, whereby, the sagittal displacement of the scan spot caused by inaccuracies in parallelism of the rotating mirror with its rotational axis, which tends to be relatively high due to multiple deflection, is further reduced in a self correcting mode, in such a way that the sagittal runout of the imaginary object due to the early stages of deflection is reduced by the opposite and counteracting rotation of the imaginary part of the output beam at the last deflection, thus allowing relaxed tolerances on the rotating mirror inspite of multiple deflection.

7. The flying spot optical scanning system of claim 6 wherein the length of the imaginary part of the deflected output beam between the imaginary object and the corresponding mirror at the middle position of the scan cycle is optimized to minimize the sagittal runout of the imaginary object and consequently minimize the sagittal displacement of the scan spot caused by inaccuracies in parallelism and radial position of the rotating mirror relative to its rotational axis.

8. The flying spot optical scanning system of claim 5 wherein the rotating mirror is a multifaceted polygon, the facets of the polygon sequentially facing the fixed mirror, the applied beam being reflected and deflected only by the fixed mirror and the active polygon facet facing the fixed mirror during each complete scan cycle.

9. The flying spot optical scanning system of claim 8 wherein the sagittal and axial runout of the line image formed by the deflected output beam are found as $$\delta_s = \sum_{k=1}^{2n-1} l_{ks} - (\Delta L + l_e)\frac{l_{(2n)s}}{l_{(2n)}} - (L_{0s} - l_e \sin i)$$

and $$\delta_a = -(\Delta L + l_e)\frac{l_{(2n)t}}{l_{(2n)}} \cos \frac{2n\alpha}{2} + R\cos\frac{\theta}{2}\left(\frac{1}{\cos\frac{\alpha}{2}} - 1\right) - w_n \sin\frac{\alpha}{2} + l_e \cos i$$

where $\delta_s$ is the sagittal runout and $\delta_a$ is the axial runout of the line image relative to an optical axis perpendicular to the plane of the fixed mirror and passing through the axis of rotation of the rotating mirror, $\alpha/2$ is the rotation of the polygon or the deflecting facet relative to the optical axis, n is the total number of deflections, $l_k$ is the length of the axis of the kth beam segment between the deflecting facet and the fixed mirror, counting from the first incident beam segment on the rotating mirror, L is the total length of the axes of the beam segments (optical path length) between the planes of the rotating mirror and the fixed mirror including the first incidence up to the last incidence on the deflecting facet, $L_0$ is the value of L at $\alpha/2=0$, subscripts s and t denote sagittal and tangential components respectively, $\Delta L = L - L_0$ is the change of total optical path length between the deflecting facet and the fixed mirror due to facet to rotational axis errors and rotation of the deflecting facet, R is the circumscribing radius of the polygon, $l_e$ is the length of the deflected output beam between the line image and the deflecting facet at $\alpha/2=0$, i is the sagittal angle of incidence of the light beam applied to the multiple deflection system, $w_k$ is the tangential incidence position at the kth deflection of the light beam on the deflecting facet relative to the first incidence, $\theta$ is the subtending angle of the deflecting facet, the effect of facet to rotational axis errors of the deflecting facet being considered in the calculation of optical path length segments $l_k$.

10. The flying spot optical scanning system of claim 5 wherein the rotating mirror is a vibrating mirror and the sagittal and axial runout of the line image formed by the deflected output beam are found by the formulas of claim 9 by substituting $R=0$.

11. The flying spot optical scanning system of claim 4 wherein the first optical means is excluded and the light beam from the light source is an essentially collimated beam, said collimated beam is deflected by the multiple deflection system, and the deflected output beam, being still in collimated shape, is focused by the second optical means, the axis of the deflected output beam lying in a plane including the optical axis of the second optical means.

12. The flying spot optical scanning system of claim 11 wherein the rotating mirror is a multifaceted polygon, the facets of the polygon sequentially facing the fixed mirror, the light beam being reflected and deflected only by the fixed mirror and the active polygon facet facing the fixed mirror during each complete scan cycle.

13. The flying spot optical scanning system of claim 11 wherein the rotating mirror is a vibrating mirror.

14. The flying spot optical scanning system of claim 1 wherein the first and second optical means include refractive optical elements.

15. The flying spot optical scanning system of claim 1 wherein the first optical means includes reflective optical element.

16. A beam scanning system, employing efficient successive deflections to enhance scanning capabilities, said system comprising of:
light source for supplying a light beam;
rotating mirror for deflecting the light beam;
fixed mirror positioned face to face at in front of the rotating mirror, the combination of the fixed mirror and the rotating mirror making a multiple deflection system, implementing successive deflections of the input light beam applied thereto, the input light beam enters the multiple deflection system from one tangential side of the mirrors, the fixed mirror folds the deflected light beam from the rotating mirror back to the rotating mirror successively, until the final deflected output beam emerges from the multiple deflection system, from the other tangential side of the mirrors, after a predetermined number of deflections, irrespective of the angular position of the rotating mirror, said light beam remaining fully seated on the rotating mirror and the fixed mirror during each complete scan cycle;
whereby, a larger scan angle is obtained with high efficiency, through a smaller rotation of the rotating mirror compared to a conventional single deflection beam scanning system.

17. The beam scanning system of claim 16 wherein the input light beam is applied to the multiple deflection system with tangential symmetry, the beam lying in a sagittal plane of symmetry including the rotational axis of the rotating mirror and perpendicular to the plane of the fixed mirror.

18. The beam scanning system of claim 17 wherein the planes of the rotating mirror and the fixed mirror become essentially parallel at the middle position of each complete scan cycle.

19. The beam scanning system of claim 16 wherein the rotating mirror is a multifaceted (prismatic or pyramidal) polygon, the facets of the polygon sequentially facing the fixed mirror, the light beam being reflected and deflected only by the fixed mirror and the active polygon facet facing the fixed mirror during each complete scan cycle.

20. The beam scanning system of claim 16 wherein the rotating mirror is a vibrating mirror such as a piezoelectric or galvanometric deflector.

21. The beam scanning system of claim 16 wherein the input beam is convergent in the sagittal plane and essentially collimated in the tangential plane.

22. The beam scanning system of claim 16 wherein the deflected output beam is divergent in the sagittal plane and essentially collimated in the tangential plane.

23. The beam scanning system of claim 16 wherein the input beam is convergent to focus to a point image.

24. The beam scanning system of claim 16 wherein the input beam is divergent to focus to an imaginary point image.

25. The beam scanning system of claim 16 wherein the input beam is an essentially collimated beam.

* * * * *